(12) United States Patent
Roebke et al.

(10) Patent No.: US 8,730,312 B2
(45) Date of Patent: May 20, 2014

(54) SYSTEMS AND METHODS FOR AUGMENTED REALITY

(75) Inventors: Mark J. Roebke, Avon, CO (US); Alistair Neil Davidson, Frisco, CO (US)

(73) Assignee: The Active Network, Inc., San Diego, CA (US)

( * ) Notice: Subject to any disclaimer, the term of this patent is extended or adjusted under 35 U.S.C. 154(b) by 324 days.

(21) Appl. No.: 12/948,631

(22) Filed: Nov. 17, 2010

(65) Prior Publication Data

US 2011/0141254 A1   Jun. 16, 2011

Related U.S. Application Data

(60) Provisional application No. 61/261,885, filed on Nov. 17, 2009, provisional application No. 61/322,646, filed on Apr. 9, 2010.

(51) Int. Cl.
*G06T 11/00* (2006.01)
*H04N 7/18* (2006.01)

(52) U.S. Cl.
CPC . *G06T 11/00* (2013.01); *H04N 7/18* (2013.01)
USPC ............................................ 348/61; 345/633

(58) Field of Classification Search
USPC ................................. 348/61, E7.048; 345/633
See application file for complete search history.

(56) References Cited

U.S. PATENT DOCUMENTS

| | | | | |
|---|---|---|---|---|
| 6,985,240 B2 * | 1/2006 | Benke et al. | ................... | 356/614 |
| 7,116,342 B2 * | 10/2006 | Dengler et al. | ............... | 345/630 |
| 7,398,481 B2 * | 7/2008 | Kraus et al. | ................... | 715/848 |
| 7,916,138 B2 * | 3/2011 | John et al. | ..................... | 345/419 |
| 2007/0024644 A1 * | 2/2007 | Bailey | .......................... | 345/633 |

* cited by examiner

*Primary Examiner* — Jayanti K Patel
*Assistant Examiner* — Reza Aghevli
(74) *Attorney, Agent, or Firm* — Stetina Brunda Garred & Brucker

(57) ABSTRACT

A method for generating an augmented reality display on a display device according to embodiments of the present invention includes overlaying augmented reality data onto an actual image using three dimensional positioning data and three dimensional orientation data of the display device. The augmented reality data may include at least one line feature and/or at least one video feature, and may take into account both elevation of the device and the three-dimensional direction in which the imaging device is pointed.

21 Claims, 19 Drawing Sheets

SYSTEMS AND METHODS FOR AUGMENTED REALITY

CROSS-REFERENCE TO RELATED APPLICATIONS

This application claims the benefit of U.S. Provisional Patent Application Ser. No. 61/261,885, filed on Nov. 17, 2009, and U.S. Provisional Patent Application Ser. No. 61/322,646, filed on Apr. 9, 2010, both of which are incorporated herein by reference in their entireties for all purposes.

TECHNICAL FIELD

Embodiments of the present invention relate generally to augmented reality devices and applications, and more specifically to systems and methods for overlaying a real time picture with augmented reality features.

BACKGROUND

Existing maps and applications for mobile devices and other devices often show maps that are two-dimensional with feature locations represented as point features. Such displays are often purely location-based, and do not assist a user in identifying features that are not point features, or features that are elevation-dependent.

SUMMARY

"Augmented Reality" according to one online source is a term for a live direct or indirect view of a physical real-world environment whose elements are merged with, or augmented by, virtual computer generated imagery, creating a mixed reality. Some embodiments of the present invention include systems and methods that display on a screen point features, line features and/or elevation features overlaid onto an image that represents a camera's current field of view.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
FIG. 1 illustrates a front elevation view of a mobile device with a screen, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 2A:
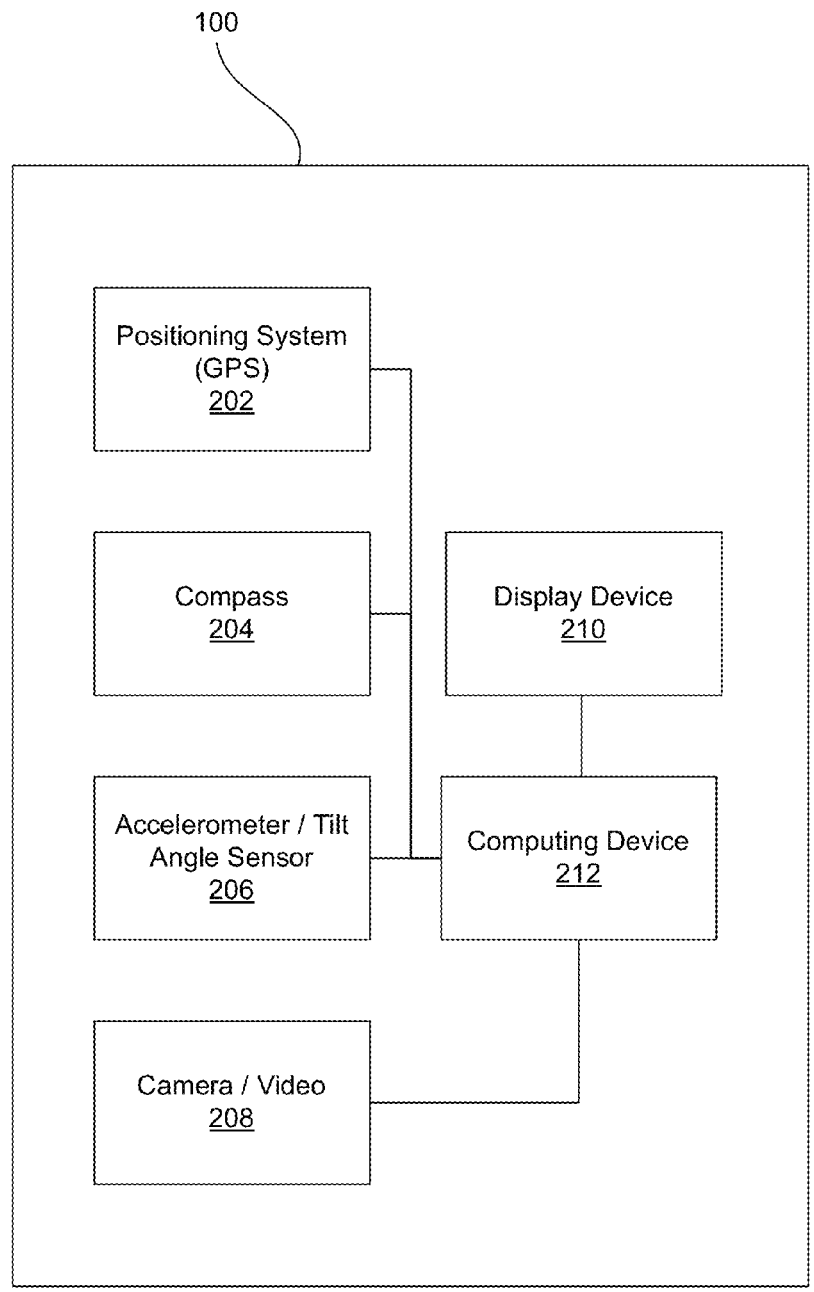
FIG. 2A illustrates a diagram of a device, according to embodiments of the present invention.

FIG. 1 illustrates a front view of a device 100, such as a mobile device. The mobile device can be, for example, an Apple iPhone® or iPhone 3G®, or other mobile phone or device, including but not limited to a personal navigation device, a GPS device, a phone, a texting device, a music player, or a video game device. FIG. 2 is a diagram illustrating various devices that may be included with or operate with device 100. Device 100 includes a computing device 212 communicably coupled to a display device 210, according to embodiments of the present invention. Display device 210 may be a screen, for example a touch-screen, for displaying visual information to a user. Device 100 also includes a camera 208 communicably coupled to the computing device 212, according to embodiments of the present invention. Camera 208 may be an imaging device and/or video device, such as, for example, a digital camera or digital video camera that captures images and communicates the images to the computing device 212, which may then process the images and/or display them on the display device 210, according to embodiments of the present invention.

As used herein, the phrase "communicably coupled" is used in its broadest sense to refer to any coupling whereby information may be passed. Thus, for example, communicably coupled includes electrically coupled by, for example, a wire; optically coupled by, for example, an optical cable; and/or wirelessly coupled by, for example, a radio frequency or other transmission media. "Communicably coupled" also includes, for example, indirect coupling, such as through a network, or direct coupling.

The device 100 may also include a positioning system 202 communicably coupled to the computing device 212, according to embodiments of the present invention. The positioning system 202 may be, for example, a global positioning system ("GPS") configured to receive satellite signals and, based on the signals, determine three-dimensional coordinates for location upon the earth's surface and transmit such location information to the computing device 212, according to embodiments of the present invention. The device 100 may also include a compass device 204 communicably coupled to the computing device 212. Compass 204 may be an electronic and/or conventional compass configured to measure and/or sense an angle with respect to a "magnetic North" field to determine the device's 100 azimuthal orientation and transmit such orientation information to the computing device 212, according to embodiments of the present invention. The device 100 may further include an accelerometer 206 or other similar device communicably coupled to the computing device 212. Accelerometer 206 senses and/or measures acceleration and can determine the device's 100 inclination angle with respect to a gravitational force and transmit such inclination angle information to the computing device 212, according to embodiments of the present invention. Although certain devices are discussed, one of ordinary skill in the art, based on the disclosure herein, will appreciate the various devices and combinations of devices that, when used or included, perform functions similar to those described above for providing location, direction, and inclination angle signals to a processor.

Figure 2B:
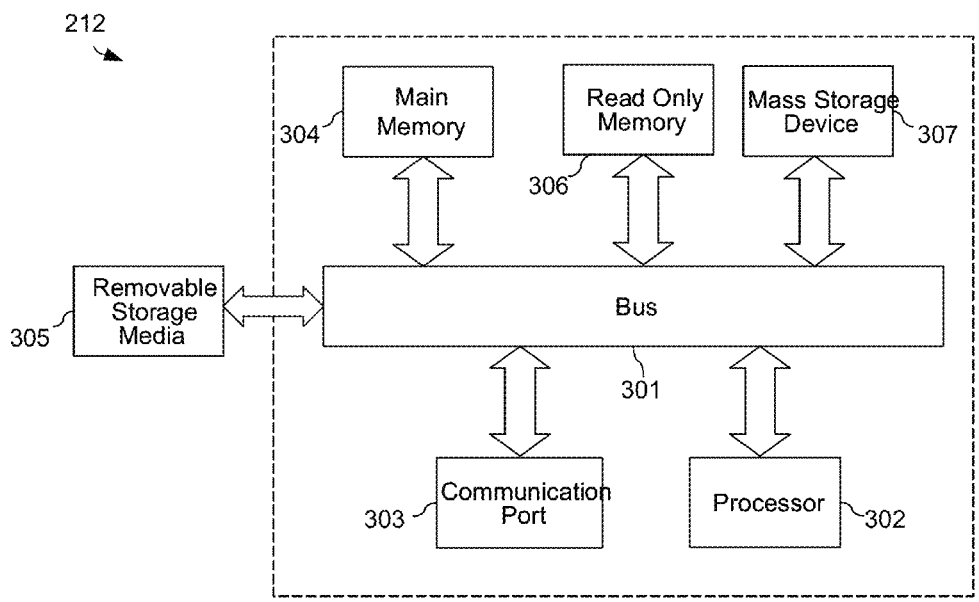
FIG. 2B illustrates a diagram of a computing device, according to embodiments of the present invention.

FIG. 2B illustrates an example of a computer system 212 with which embodiments of the present invention may be utilized. According to the present example, the computer system includes a bus 301, at least one processor 302, at least one communication port 303, a main memory 304, a removable storage media 305, a read only memory 306, and a mass storage 307.

Processor(s) 302 can be any known processor, such as, but not limited to, an Intel® Itanium® or Itanium 2® processor(s), or AMD® Opteron® or Athlon MP® processor(s), or Motorola® lines of processors. Communication port(s) 303 can be any of an RS-232 port for use with a modem based dialup connection, a 10/100 Ethernet port, or a Gigabit port using copper or fiber, for example. Communication port(s) 303 may be chosen depending on a network such a Local Area Network (LAN), Wide Area Network (WAN), or any network to which the computer system 212 connects, including a wireless network, for example. Main memory 304 can be Random Access Memory (RAM), or any other dynamic storage device(s) commonly known to one of ordinary skill in the art. Read only memory 306 can be any static storage device(s) such as Programmable Read Only Memory (PROM) chips for storing static information such as instructions for processor 302, for example.

Mass storage 307 can be used to store information and instructions. For example, hard disks such as the Adaptec® family of SCSI drives, an optical disc, an array of disks such as RAID (e.g. the Adaptec family of RAID drives), or any other mass storage devices may be used, for example. Bus 301 communicably couples processor(s) 302 with the other memory, storage and communication blocks. Bus 301 can be a PCI/PCI-X or SCSI based system bus depending on the storage devices used, for example. Removable storage media 305 can be any kind of external hard-drives, floppy drives, flash drives, IOMEGA® Zip Drives, Compact Disc-Read Only Memory (CD-ROM), Compact Disc-Re-Writable (CD-RW), or Digital Video Disk-Read Only Memory (DVD-ROM), for example. The components described above are meant to exemplify some types of possibilities. In no way should the aforementioned examples limit the scope of the invention, as they are only exemplary embodiments. For example, various hardware within computer device 212 may be specific to mobile devices, according to embodiments of the present invention.

Embodiments of the present invention display data about features based on the location of those features, and the location and orientation of the device 100. To accomplish this, the device 100 has access to a three-dimensional spatial database that relates features to three-dimensional coordinates, according to embodiments of the present invention. Such a spatial database may be stored on device 100, for example in read only memory 306, mass storage device 307, and/or removable storage media 305. The spatial database may also be stored remotely from the device 100, such as on a satellite computing device or server, that may be accessed remotely by device 100 through its communication port(s) 303, according to embodiments of the present invention.

To create the mobile three-dimensional spatial database, spatial vector data, e.g. points, lines and areas, may be obtained from a commercially available source in a common file format, e.g. Geographic Markup Language (GML), Data Exchange Format (DXF), Environmental Science Research Institute (ESRI) Shapefile, delimited text, and the like. The spatial data file defines spatial features in a common Spatial Reference System, e.g. latitude and longitude, Universal Transverse Mercator (UTM), and the like, corresponding to a ground surface of the earth or a portion thereof. The spatial data file may correspond to, or may be trimmed to correspond to, a particular geographic location or geo-political boundary. For example, the spatial data file may correspond to the area of a ski resort (and surrounding areas), according to embodiments of the present invention.

Figure 3:
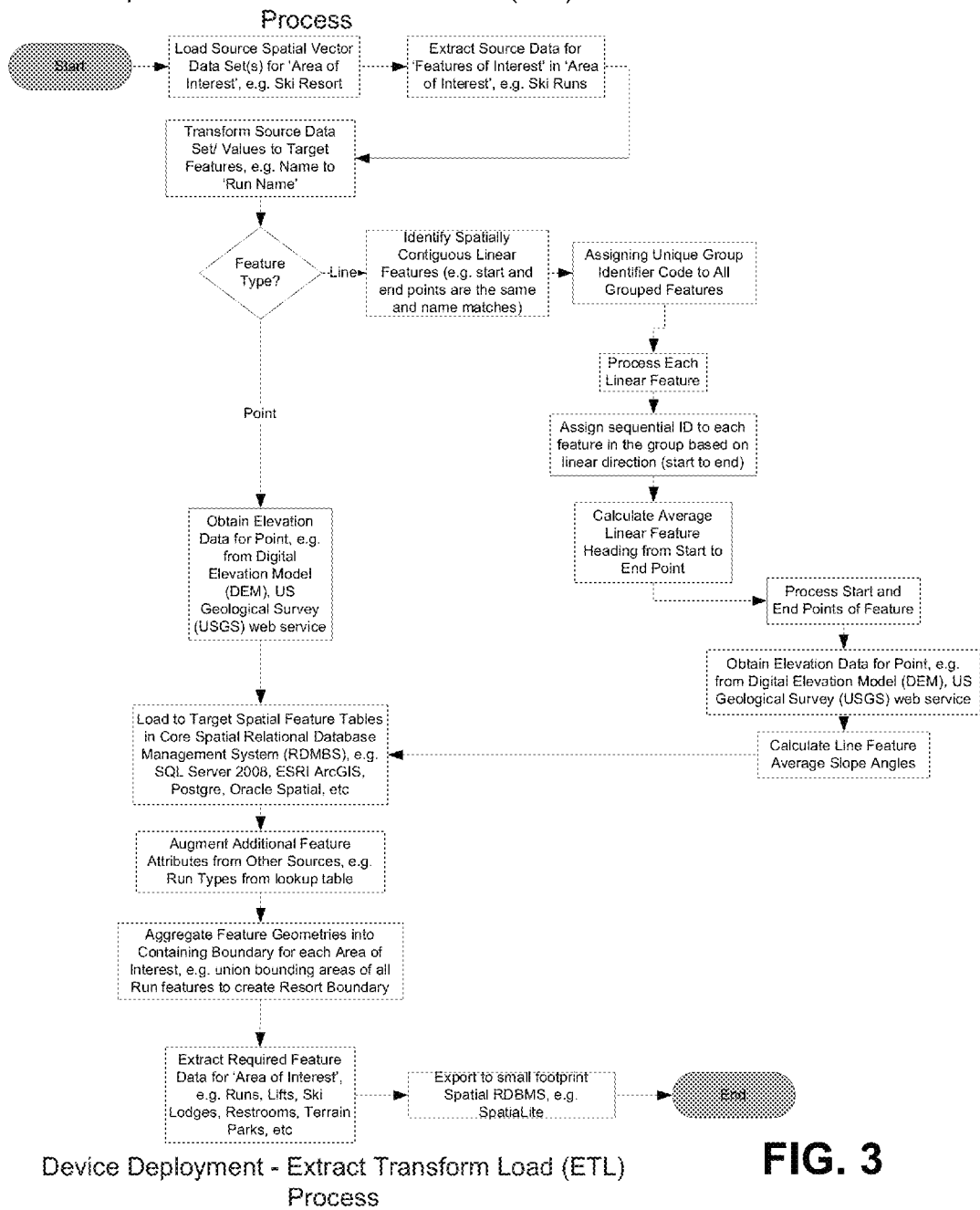
FIG. 3 depicts a flow chart illustrating a data acquisition and device deployment method for an extract transform load process, according to embodiments of the present invention.

As illustrated in FIG. 3, feature data is extracted from the source data file, transformed to match real world features of interest and then loaded into a spatially enabled central Relational Database Management System (RDBMS) for storage. During the Extract Transform and Load (ETL) process the source data is augmented with additional information from other commercially and/or freely available sources, for example elevation data, and then pre-processed in order to identify salient spatial feature information used to visualize complex three-dimensional spatial features in an augmented reality environment, for example, a feature heading direction indicator. This pre-processing includes, but is not limited to, deriving feature directional heading, elevation changes, slope angle, and combined feature boundary areas, for example in the manner illustrated in FIG. 3. Additional attribute information may then be added to features in order to support functionality in the augmented reality application, for example, a feature in the database may contain a column defining the a point location (for example, by latitude and longitude), and a second column defining elevation. Additional columns may be added to include information about a feature, such as, for example, a textual name, description, altitude, slope angle and/or relative heading. Processed data is then extracted from the central spatial repository and exported directly without transformation to a lightweight spatially enabled RDBMS for deployment to the device 100, according to embodiments of the present invention.

Point features may include, for example, facilities or buildings, equipment location, a trailhead, a start point, or an end point. Two or more point features may be associated in the three-dimensional spatial database, for example with a unique shared identifier. Linear and area features, defined through simple coordinate strings, or more complex spatial algorithms, may be used to represent complex features. Non-limiting examples of line features include trails, roads, ski runs, ski lift paths, equipment routes, and elevation lines, according to embodiments of the present invention. Non-limiting examples of area features include boundaries depicting demarcation by political administration, ownership, usage, coverage, and operations, according to embodiments of the present invention. The storage of spatial features and subsequent analysis of spatial relationships between stored features using common spatial operators, for example "contains" "intersects" "within" "nearest neighbor" and similar methods permits the computer 212 to display on the display device 210 information relating to a three-dimensional position of features relative to the current location of the computing device 100.

In addition to indicating feature locations in the spatial database, a further depth of information about each feature may be included in the spatial database. For example, for point features such as facilities or buildings, the spatial database may include (in addition to the position information) information about the type of facility (e.g. lodge, ski lift, first aid/ski patrol, restaurant, trailhead), hours of operation, activities (e.g. terrain parks or special areas) and/or the amenities available (e.g. restrooms, restaurants, first aid, retail). For point, line, and area features such as those defining ski runs, the spatial database may include information about skill designation or difficulty (e.g. green, blue, black) and heading. According to some embodiments of the present invention, the three-dimensional spatial database may be dynamically updateable in real time; for example, a data field in the spatial database associated with a ski lift feature may indicate wait time for boarding the ski lift (e.g. number of minutes or red/yellow/green) based on social-based movement data collected remotely from one or more other devices. The three-dimensional spatial database, once created, may be stored on the device 100 as described above, and may be referred to as a map, according to embodiments of the present invention. The device 100 may include or have access to multiple maps corresponding to different geographic locations and/or types of activity or use, according to embodiments of the present invention.

The following open source tools may be used in the development of the extract transform load process, for example the process described with respect to FIG. 3: SharpMap 2.0 and ADO.NET 2.0 SqLite Data Provider 1.0.65 according to embodiments of the present invention.

Figure 4:
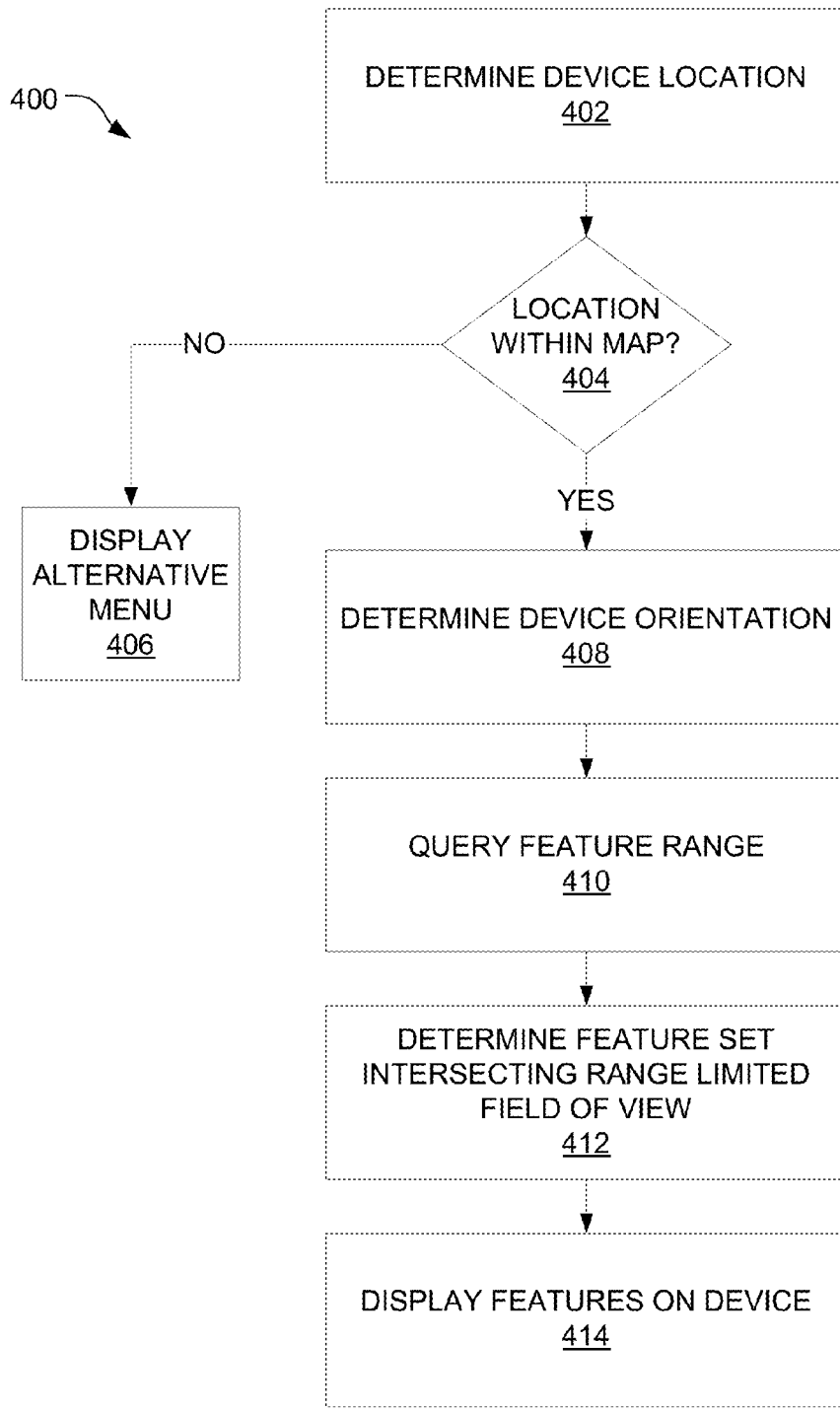
FIG. 4 depicts a flow chart illustrating a method for overlaying augmented reality point and line features onto a visual display, according to embodiments of the present invention.

FIG. 4 depicts a flow chart 400 illustrating a method for determining device 100 location and orientation and displaying features on the device 100, according to embodiments of the present invention. The steps illustrated in flow chart 400 may be performed by the processor 302 of computing device 212, according to embodiments of the present invention. According to some embodiments of the present invention, processor instructions are written in the Objective C language and the database is accessed in SQL. The device 100 location may be determined (block 402) by the GPS 202, according to embodiments of the present invention. The GPS 202 transmits location information to the computing device 212, which may include three-dimensional location information such as, for example, latitude, longitude, and elevation, according to embodiments of the present invention. A determination is made about whether the location of the device 100 is within the boundaries of a map or spatial database (block 404).

Figure 5:
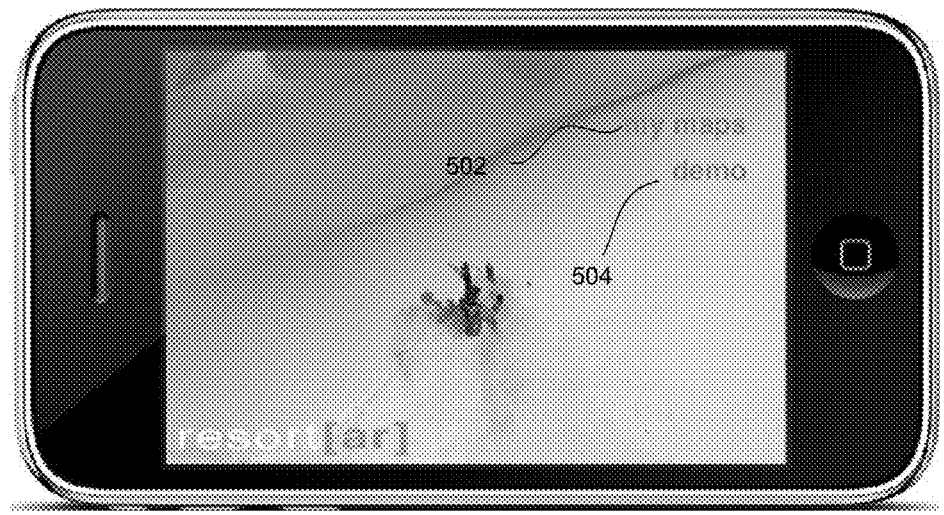
FIG. 5 illustrates a menu screen view, according to embodiments of the present invention.
Figure 6:
FIG. 6 illustrates a demonstration screen view, according to embodiments of the present invention.

If the location of the device 100 is not within a map (e.g. within a predetermined boundary of a resort record in the spatial database) stored on or accessible by the device 100, then the device 100 display screen 210 may display an alternative menu structure (block 406). An example of such an alternative menu structure is illustrated in the display of FIG. 5, which offers the user a selection between a "my maps" selection 502 and a "demo" selection 504. Selecting the "my maps" selection 502 takes the user to a screen that shows the user the maps installed on the device 100 and/or offers new maps for purchase or acquisition by the user, according to embodiments of the present invention. Selecting the demo selection 504 takes the user to a demonstration screen that permits the user to experience the augmented reality view when not at one of the locations supported by a map. For example, the user is taken to a screen similar to that displayed in FIG. 6, which lists available maps and/or locations selectable by the user for demonstration.

If the device 100 location is within a map, the device orientation is determined (block 408). For example, the processor 302 may read compass data and/or accelerometer data received and stored from the compass 204 and accelerometer 206 to determine the azimuth and inclination angles. Because the position of the screen/display 210 is often fixed or otherwise known with respect to the camera 208, GPS 202, compass 204, and/or accelerometer 206, the orientation of the camera 208 view may be determined in three-dimensional polar coordinates, according to embodiments of the present invention. A feature range may be queried (block 410). The device may generate a "preferences screen" that allows the user to set filters for point features to display (e.g. run, lift, facility, activity, all) and run type display (e.g. green, blue, black, all) and also set search radius, according to embodiments of the present invention.

The feature range (e.g. search radius) is a distance from the device 100; features located within the feature range are displayed on the device 100, while features outside of the feature range are not displayed on the device 100. For example, the feature range may be forty meters, fifty meters, sixty meters, one hundred meters, two hundred meters, one kilometer, and/or any incremental distance. According to embodiments of the present invention, the feature range may be preset and/or stored on the device 100 and queried by the processor 302. According to other embodiments of the present invention, the device 100 may prompt the user to enter a desired feature range.

The device 100 may calculate a field of view based on the feature range and the viewing range of the camera 208. The field of view is a volume extending radially from the device 100 between the upper, lower, and side extents of the camera's viewing range, and bounded by the sphere defined by the distance of the feature range measured from the device 100 position, according to embodiments of the present invention. Based on the identified field of view as well as the device 100 orientation determination, the device 100 determines which features in the three-dimensional spatial database intersect the field of view volume (block 412). These intersecting features may be flagged for display on the device 100. The device 100 next determines how the flagged features are to be displayed, and displays them on the device 100 (block 414), according to embodiments of the present invention.

Figure 7:
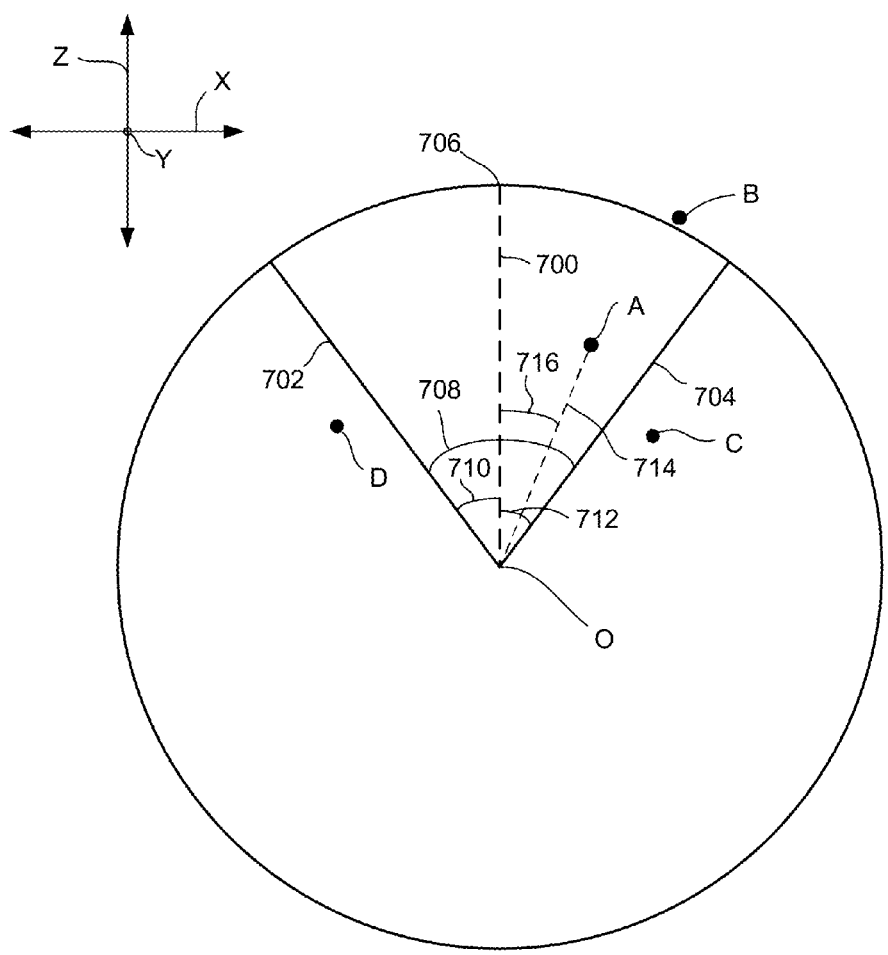
FIG. 7 illustrates a top plan view of a field of view diagram in an X-Z plane, according to embodiments of the present invention.
Figure 8:
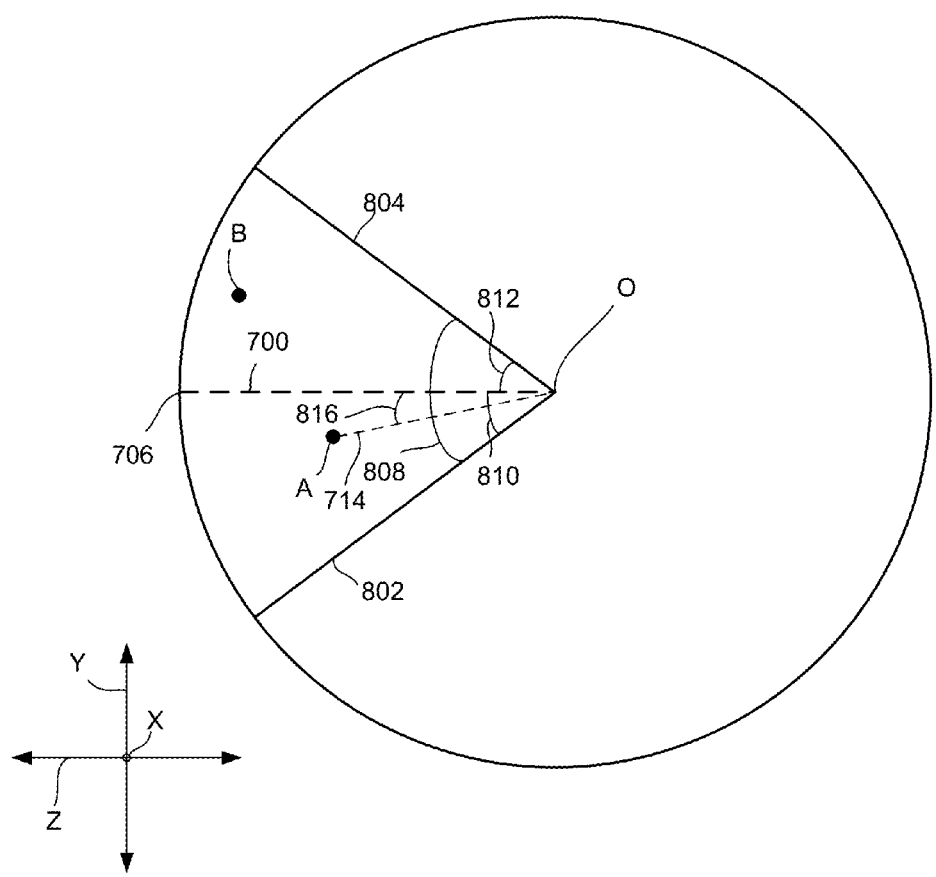
FIG. 8 illustrates a side elevation view of a field of view diagram in a Y-Z plane, according to embodiments of the present invention.
Figure 9:
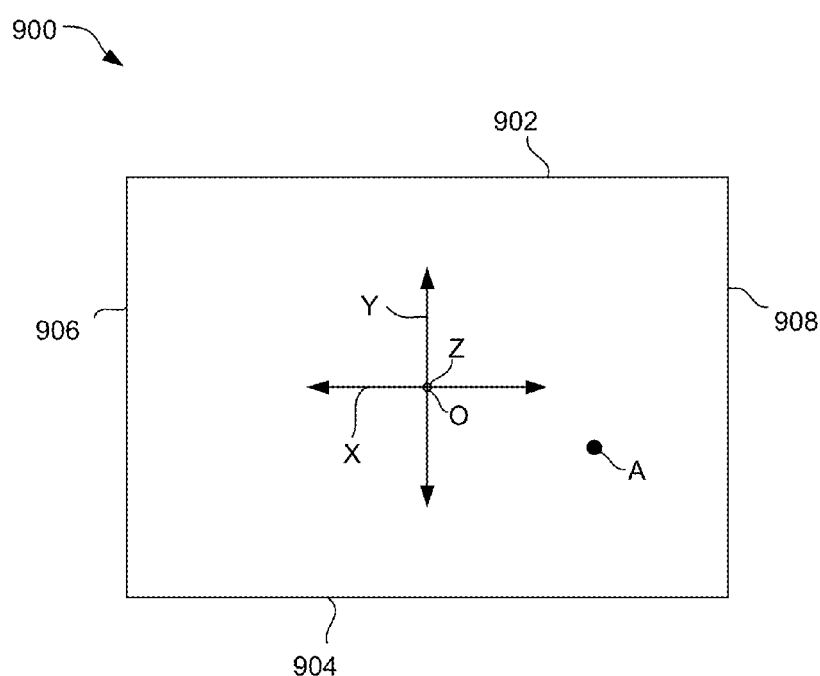
FIG. 9 illustrates a front elevation view of a screen, according to embodiments of the present invention.

FIGS. 7-9 illustrate how the intersection of the field of view and the features are determined, and how the mapping of the features onto the display is accomplished, according to embodiments of the present invention. FIG. 7 illustrates a view along the Y axis of a field of view of device 100. The device 100 location is at the origin O, and the viewing angle of the camera 208 lens extends from a maximum extent 702 to a maximum extent 704; in other words, the viewing angle of the camera 208 is angle 708. The center of the viewing angle is indicated by segment 700; segment 700 extends along a line from the center of the camera 208 perpendicularly to the imaging surface of the camera 208, along the Z axis. The X, Y, and Z axes are a graphical frame of reference with respect to the origin O (e.g. the device 100 location). The length of segment 700 between point O and point 706 corresponds to the feature range distance (which may be specified by the user). Thus, the field of view of the device 100 includes the volume between the maximum extents 702, 704 and within the feature range distance from point O; in other words, the field of view of the device 100 at point O is represented by a pie shape formed by extents 702, 704 and length of segment 700 in FIG. 7, according to embodiments of the present invention.

At block 412 of flow chart 400, the device 100 determines which features intersect the field of view of the device 100. FIG. 7 illustrates various point features A, B, C, and D contained within the spatial database, whose three-dimensional positions are defined by the spatial database. Based on the compass 204 data and the device 100 geometry, the computing device 212 determines the location of segment 700 and/or extents 702, 704 with respect to the three-dimensional spatial database points. The computing device 212 queries each point feature A, B, C, D and uses geometric calculations (e.g. trigonometric and/or triangulation techniques) to determine whether the point feature is within the field of view. When the computing device 212 makes a determination for point B, the computing device 212 determines that the distance between O and B is greater than the feature range (e.g. greater than the distance between O and point 706), and therefore that point feature B lies outside of the field of view of the device 100. When the computing device 212 makes a determination for points C and D, the computing device 212 determines that an angle between segment 700 and segment OC is greater than angle 712 and an angle between segment 700 and segment OD is greater than angle 710, and therefore that such point features C and D lie outside of the field of view of the device 100, according to embodiments of the present invention.

When the computing device 212 makes a determination for point A, the computing device 212 determines that the length of segment 714 is shorter than the feature range (e.g. shorter than the distance between O and point 706), and also that angle 716 is less than angle 712. Before the computing device 212 flags the point feature A as being within the field of view, the computing device 212 must perform similar checks to ensure that point feature A also falls within the viewing angle and feature range of the device 100 in the Z-Y plane, as illustrated in FIG. 8.

FIG. 8 illustrates a view along the X axis (in the Z-Y plane) of a field of view of device 100. The device 100 location is at the origin O, and the viewing angle of the camera 208 lens extends from a maximum extent 802 to a maximum extent 804; in other words, the viewing angle of the camera 208 is angle 808. The center of the viewing angle is indicated by segment 700; segment 700 extends along a line from the center of the camera 208 perpendicularly to the imaging surface of the camera 208, along the Z axis. The X, Y, and Z axes are a graphical frame of reference with respect to the origin O (e.g. the device 100 location). The length of segment 700 between point O and point 706 corresponds to the feature range distance (which may be specified by the user). Thus, the field of view of the device 100 includes the volume between the maximum extents 802, 804 and within the feature range distance from point O; in other words, the field of view of the device 100 at point O is represented by a pie shape formed by extents 802, 804 and length of segment 700 in FIG. 8, according to embodiments of the present invention.

When the computing device 212 makes a determination for point A, the computing device 212 determines that the length of segment 714 is shorter than the feature range (e.g. shorter than the distance between O and point 706), and also that angle 816 is less than angle 810. Because point A falls within the projection of the field of view in both the X-Z (FIG. 7) and Y-Z (FIG. 8) planes, the computing device 212 flags or otherwise identifies point feature A as a feature that should be displayed on the display device 210, according to embodiments of the present invention. Although point B falls within the field of view projection in the Y-Z plane, it does not fall within the field of view volume, as evidenced by the fact that it does not fall within the field of view projection in the X-Z plane; thus, the computing device 212 determines that point B should not be displayed on the display device.

Although projections of the field of view in the X-Z and Y-Z planes are shown as examples, one of ordinary skill in the art, based on the present disclosure, will appreciate that the calculations to determine intersection of the features with the field of view may be accomplished in various other ways, for example using polar geometry and calculus-based expressions and tests.

FIG. 9 illustrates an exemplary screen 900, which may be part of display device 210. A rectangular screen 900 is shown, and the center of the rectangular screen 900 is at origin point O, and the screen 900 (and camera 208) are pointed along the Z axis. The screen includes top edge 902, bottom edge 904, left edge 906, and right edge 908. When the device 100 is held with the screen 900 (and hence the camera 208 imaging surface) in the X-Y plane, when the Y axis is aligned with the direction of gravity, rotating the camera 208 clockwise or counter-clockwise in the view of FIG. 7 turns the camera right and left with respect to the horizon, and rotating the camera 208 clockwise or counterclockwise in the view of FIG. 8 rotates the inclination angle up and down with respect to the horizon, according to embodiments of the present invention.

Once the computing device 212 determines that point feature A should be displayed on screen 900, computing device 212 determines where on screen 900 to display point A. According to some embodiments of the present invention, the X value of the displayed location of A is determined by angle 716, and the Y value of the displayed location of A is determined by angle 816. For example, the ratio of the number of pixels between origin O and point A along the X direction to the total number of pixels between origin O and edge 908 is equal to the ratio of angle 716 to angle 712, according to embodiments of the present invention. The ratio of the number of pixels between origin O and point A along the Y direction to the total number of pixels between origin O and edge 904 is equal to the ratio of angle 816 to angle 810, according to embodiments of the present invention.

As one example, the screen 900 may include 480 pixels along the X direction (e.g. length of edges 902, 904), and 320 pixels in the Y direction (e.g. length of edges 906, 908). If angle 716 is exactly half of angle 712, and if angle 816 is exactly half of angle 810, then point A will be located 240 pixels in the X direction from point O toward edge 908, and 160 pixels in the Y direction from point O toward edge 904. In addition to or instead of this procedure for mapping the three-dimensional location of points onto a two-dimensional screen, other mapping procedures may be used. For example, algorithms that correct for potential skewing associated with mapping polar coordinates onto a flat display may be used for improved display accuracy, according to embodiments of the present invention. According to embodiments of the present invention, point feature A is overlaid on the display of screen 900 onto the real-time or substantially real-time video view of the camera 204, such that the user sees point A in the visual context of the surrounding physical environment. For example, if point A is the start point of a ski run, the user might see top of a hill in the vicinity of point A.

Figure 10:
FIG. 10 illustrates a front elevation view of a simulated augmented reality point feature display, according to embodiments of the present invention.

FIG. 10 illustrates an example of a simulated screen shot showing three different point features displayed over a backdrop camera picture of the surrounding physical environment. As illustrated in FIG. 10, the top of the screen display may include an identification of the resort, map name, location, weather, snowfall, ski conditions, compass orientation, wind direction, and/or the like, according to embodiments of the present invention. Selecting one of the displayed point features presents a "Detail View." For a ski resort map, clicking on a "run" point feature may display the run name, skill level, and length; clicking on a "lift" point feature may display the lift name, the type (e.g. quad, etc.), length, and life line time; and clicking on a "facility" point feature may display the facility name, amenities (e.g. restrooms, ski patrol, lessons, food, etc.), and hours of operation, according to embodiments of the present invention.

Figure 11:
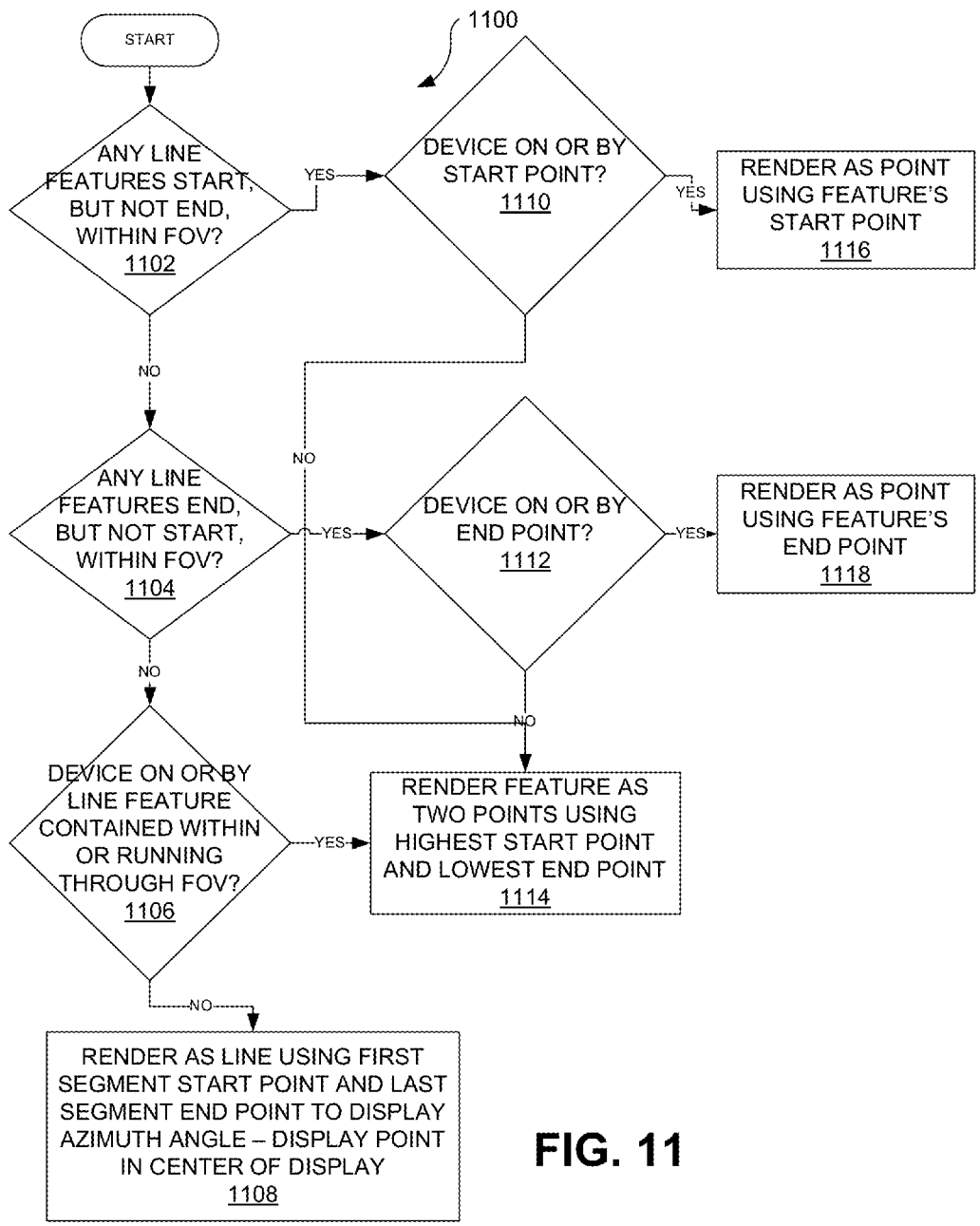
FIG. 11 depicts a flow chart illustrating a method for determining how to visually render a line feature, according to embodiments of the present invention.

FIG. 11 depicts a flow chart 1100 illustrating a method for determining how to display a line feature on display device 210 (e.g. screen 900), according to embodiments of the present invention. The line feature may be, for example, two points defined in the spatial database corresponding to a start point and end point of a ski run. First, a determination is made about whether any line features start, but not end, within the field of view (block 1102). If yes, then another determination is made about whether the device 100 is on or by the start point (block 1110). The "or by" limitation may be a predefined distance, for example. If yes, then the line feature is rendered on the screen as a point using the line feature's start point (block 1116). If the determination of block 1110 is negative, then the line feature is rendered as two points using a highest start point and a lowest end point (block 1114).

If the determination of block 1102 is negative, a further determination is made about whether any line features end, but not start, within the field of view (block 1104). If yes, then a further determination is made about whether the device 100 is on or by the end point (block 1112). If yes, then the line feature is rendered on the screen as a point using the line feature's end point (block 1118). If the determination of block 1112 is negative, then the line feature is rendered as two points using a highest start point and a lowest end point (block 1114). If the determination of block 1104 is negative, a further determination is made about whether the device 100 is on or by the line feature contained within or running through the field of view (block 1106). If yes, then the line feature is rendered as two points using a highest start point and a lowest end point (block 1114). If not, then the line feature is rendered as a line using the first segment start point and the last segment end point (block 1108), according to embodiments of the present invention.

According to some embodiments of the present invention, if a point feature (or part of a line feature) is within a certain distance from the device 100 (e.g. within fifty meters), the device 100 renders the point feature on the display screen 900 at the current elevation of the device 100 rather than at the elevation of the point feature. This helps to avoid any confusion by the user who is "just on top of" or "just below" a point feature, but whose camera view does not include the actual elevation of the point feature.

According to some embodiments of the present invention, blocks 408, 410, 412, and 414 of flow chart 400 and the blocks of flow chart 1100 are repeated periodically to refresh the display device 210 to reflect the correct features corresponding with the physical camera view. According to some embodiments of the present invention, the calculations are repeated at least every twentieth of a second. According to other embodiments, the refresh rate is higher or lower.

The following software code illustrates an example of a routine for determining whether a line feature is within the field of view and establishing an X coordinate for the feature rendering, according to embodiments of the present invention. This routine is similar to that described with respect to FIG. 11, according to embodiments of the present invention. In the following routine, "leftAzimuth" is the heading boundary on the left side of the viewing device 210, corresponding to reference 702 in FIG. 7; "centerAzimuth" is the heading of the center of the viewer, corresponding to segment 700 in FIG. 7; "rightAzimuth" is the heading boundary of the right side of the viewer, corresponding to reference 704 in FIG. 7; "coordinate.Azimuth" is the start heading of the line coordinate; and "coordinate.EndAzimuth" is the end heading of the line, according to embodiments of the present invention.

```
if (coordinate.geoType == GeoLine) {
    //check if we have some part of the line in our view (but not start or end point)
    if (coordinate.azimuth < coordinate.endAzimuth) {
    // center would be between
        result = (centerAzimuth > coordinate.azimuth && centerAzimuth < coordinate.endAzimuth);
    }
    // coordinates flipped
    if (coordinate.endAzimuth < coordinate.azimuth) {
        // center would be outside
        result = (centerAzimuth > coordinate.endAzimuth || centerAzimuth < coordinate.azimuth);
    }
    // North (0) is in our view, process if we are past zero - ADD PI to everything to get off of 0 and
    do easier math!
    if (leftAzimuth > rightAzimuth) {
        if (coordinate.azimuth + M__PI < coordinate.endAzimuth + M__PI) {
        // center would be between
        result = (centerAzimuth + M__PI > coordinate.azimuth + M__PI && centerAzimuth + M__PI
```

-continued

```
< coordinate.endAzimuth + M_PI);
        }
// coordinates flipped
if (coordinate.endAzimuth + M_PI < coordinate.azimuth + M_PI) {
        // center would be outside
        result = (centerAzimuth + M_PI > coordinate.endAzimuth + M_PI || centerAzimuth +
M_PI < coordinate.azimuth + M_PI);
        }
}
if (result == YES)
{
//NSLog([NSString stringWithFormat:@"LineSegment:%@ A: %f Ae: %f", coordinate.title,
coordinate.azimuth, coordinate.endAzimuth]);
// if we are here, default to use center unless it's one of the points
pointAzimuth = centerAzimuth;
}
// if we didn't get a hit on the line, check for start/end
if (!result) {
        // check for start point
        result = (coordinate.azimuth > leftAzimuth && coordinate.azimuth < rightAzimuth);
        // past 0
        if (leftAzimuth > rightAzimuth) {
        result = (coordinate.azimuth < rightAzimuth || coordinate.azimuth > leftAzimuth);
}
if (result == YES)
{
//NSLog([NSString stringWithFormat:@"StartA:%@   A:%f   Ae:%f", coordinate.title,
coordinate.azimuth, coordinate.endAzimuth]);
// leave it, we'll use start point
pointAzimuth = coordinate.azimuth;
}
if (!result) {
        // if not, check if we are picking up end point
        result = (coordinate.endAzimuth > leftAzimuth && coordinate.endAzimuth <
rightAzimuth);
        // past 0
        if(leftAzimuth > rightAzimuth) {
        result = (coordinate.endAzimuth < rightAzimuth || coordinate.endAzimuth > leftAzimuth);
        }
            if (result == YES)
            {
//NSLog([NSString stringWithFormat:@"EndA:%@   A:%f   Ae:%f", coordinate.title,
coordinate.azimuth, coordinate.endAzimuth]);
            // use end point
            pointAzimuth = coordinate.endAzimuth;
            }
        }
}
```

Figure 12:
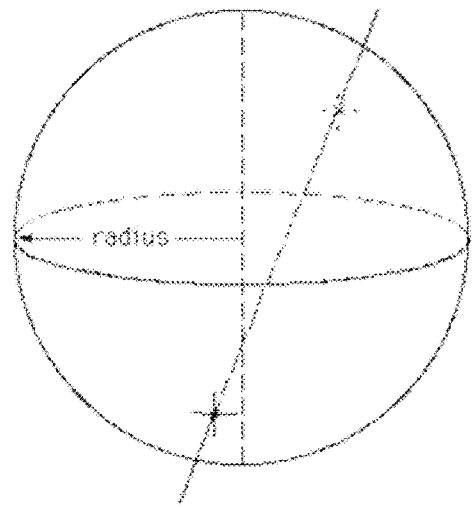
FIG. 12 illustrates a spherical frame of reference, according to embodiments of the present invention.

FIG. 12 illustrates how computing device 212 generates overlays on three dimensions by considering a sphere generated using the user's current position and a search radius (e.g. feature range). Point features are mapped within the sphere and translated to two dimensional geometry as single X, Y coordinates on an azimuth (heading) from the current position, as illustrated in FIGS. 7 and 8. Line features are processed as two points of intersection to the sphere and a segment in between. The end points of the line segments are rendered similar to single points and the line segment is displayed by taking into account the azimuths of the intersection points, according to embodiments of the present invention.

Figure 13:
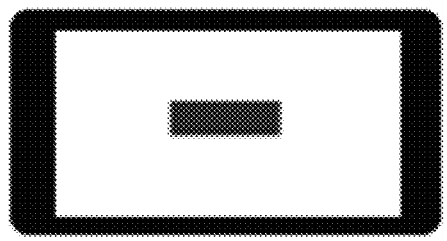
FIG. 13 illustrates a simulated screen shot showing a point feature represented by rectangular overlay, centered on the X-Y origin of the screen, according to embodiments of the present invention.

FIG. 13 illustrates a simulated screen shot showing a start point, end point, or point of interest point (e.g. a point feature) represented by rectangular overlay, centered on the X-Y origin of the screen.

Figure 14:
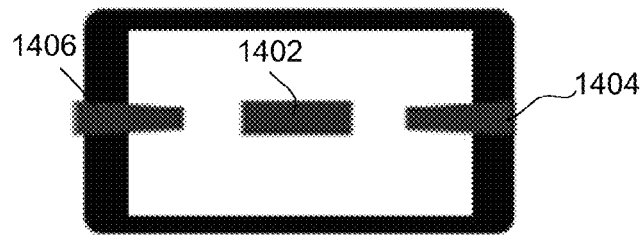
FIG. 14 illustrates a simulated screen shot showing a line feature, according to embodiments of the present invention.

FIG. 14 illustrates a simulated screen shot showing a line feature. When the start or end point of a line feature is within the field of view, the line feature is displayed with perspective on the relevant side of the display. As the user pans the landscape, and is oriented toward the line feature, a center overlay is displayed tracking along that feature until a point is encountered. The diagram below shows the point perspectives 1404, 1406 and center overlay 1402 all on one screen, according to embodiments of the present invention.

According to some embodiments of the present invention, the spatial database is created with and is interacted with (e.g. queried, manipulated, projected, imported, exported) using the SpatiaLite 2.3.1 software. The following documents located on this website as of Nov. 17, 2009 are incorporated by reference herein for all purposes: SpatiaLite Architecture, SpatiaLite C API Reference, SpatiaLite Manual, SpatiaLite Tutorial, and ADO.NET 2.0/3.5 SQLite Data Provider ReadMe file. Using the SpatiaLite software, the following is an example of a point feature query to the spatial database:

```
@"SELECT X(StartPoint(rs.Route)) as StartPointX, "
    "Y(StartPoint(rs.Route)) as StartPointY, "
    "r.Name, rs.Heading, rs.StartAltitude, rs.RunTypeID, "
    rt.Description "
    "FROM RunSegment rs "
    "JOIN Run r ON rs.RunId = r.RunId "
    "JOIN RunType rt ON rs.RunTypeID = rt.RunTypeID "
    "WHERE MBRContains(BuildCircleMBR (%f, %f, %f, 4030),
    StartPoint(rs.Route)) "
    "AND rs.IsStart = 'Y' "
    "AND r.IsNamed = 'Y' "
```

Using the SpatiaLite software, the following is an example of a line feature query to the spatial database:

```
@"SELECT r.RunId, rs.SegmentId, r.Name, rs.RunTypeID,
rt.Description, "
    "X(StartPoint(rs.Route)) as StartPointX, "
    Y(StartPoint(rs.Route)) as StartPointY, "
    "rs.StartAltitude, "
    "X(EndPoint(rs.Route)) as EndPointX, "
    "Y(EndPoint(rs.Route)) as EndPointY, "
    "rs.EndAltitude, rs.Heading "
    "FROM RunSegment rs "
    "JOIN Run r ON rs.RunId = r.RunId "
    "JOIN RunType rt ON rs.RunTypeID = rt.RunTypeID "
    "WHERE MBRIntersects(BuildCircleMBR(%f,%f, %f, 4030),
    rs.Route) "
    "AND r.IsNamed = 'Y' "
    "ORDER BY r.RunId ASC, SegmentId ASC"
```

According to some embodiments of the present invention, the user may make a selection on the display that causes the processor to switch the display to a two-dimensional flat map mode which displays the current location of the device 100. According to embodiments of the present invention, the device 100 offers routing instructions from one point to another. For example, the device 100 suggests the shortest route between two points, the quickest or easiest way down a route, the most groomed ski run. According to embodiments of the present invention, the device 100 permits users to make restaurant reservations after selecting a restaurant point feature. According to embodiments of the present invention, a user can tag or otherwise mark the location of a particular spot, such as a parking spot, locker, start location, restaurant, and show the spot in the augmented reality/feature overlay view and/or a two dimensional map view. According to other embodiments of the present invention, the user can tag or otherwise locate or track (e.g. in three-dimensional overlay view) mobile elements such as, for example, friends and children.

Figure 15:
FIG. 15 illustrates a screen shot showing a ski lift run feature, according to embodiments of the present invention.

FIGS. 15-19 illustrate screen shots showing various features overlaid onto actual camera views of a ski resort landscape, according to embodiments of the present invention. FIG. 15 illustrates a view corresponding to the user standing on a ski run called "International." This view corresponds generally to the rendering described with respect to block 1114 of FIG. 11, according to embodiments of the present invention. In the view of FIG. 15, the user is standing on or near (e.g. within fifty meters or other preselected criteria) the ski run "International." The box 1502 containing the feature description "International" is placed at the highest start point and lowest end point of the ski run feature (such that if the user turned around, the user would see the feature box at the highest end point of the run within the field of view. According to some embodiments of the present invention, other visual indicators, such as color indicators, may be used to indicate the status of features with respect to the user. For example, a feature name may appear in yellow if the user is on or near the feature, while a feature name may appear in white if the user is not on or near it but it intersects the user's field of view, according to embodiments of the present invention.

The feature rendering in FIG. 15 further displays a heading indicator 1506 in the form of a black arrow, which indicates that the ski run "International" continues from the location of the box 1502 over the ridge in the direction indicated by arrow 1506. FIG. 15 also illustrates a slider bar input 1504 which may be slid between "+" and "−" by the user to indicate the user's selected feature range (e.g. distance from the user of the field of view within which features will be displayed). For example, sliding the bar closer to the "−" indicator will display features that are further and further away from the user. According to some embodiments of the present invention, a sizing algorithm is employed to make the size of the rendered feature box 1502 proportional to the distance between the device 100 and the displayed feature location.

Figure 16:
FIG. 16 illustrates a screen shot showing two ski lift run features, according to embodiments of the present invention.

FIG. 16 illustrates a screen display showing two ski run features. The user is standing on or near a ski run feature called "Gitalong Road," of which the lowest end point in the field of view is displayed along with a heading indicator indicating that "Gitalong Road" continues down and to the right of the displayed end point feature location, similar to block 1114 of FIG. 11. FIG. 16 also displays a ski run called "Bear Tree" which the user is not on or near, but which starts at the feature location shown in FIG. 16 and continues in the direction of the heading indicator, similar to the rendering described with respect to block 1108 of FIG. 11, according to embodiments of the present invention.

Figure 17:
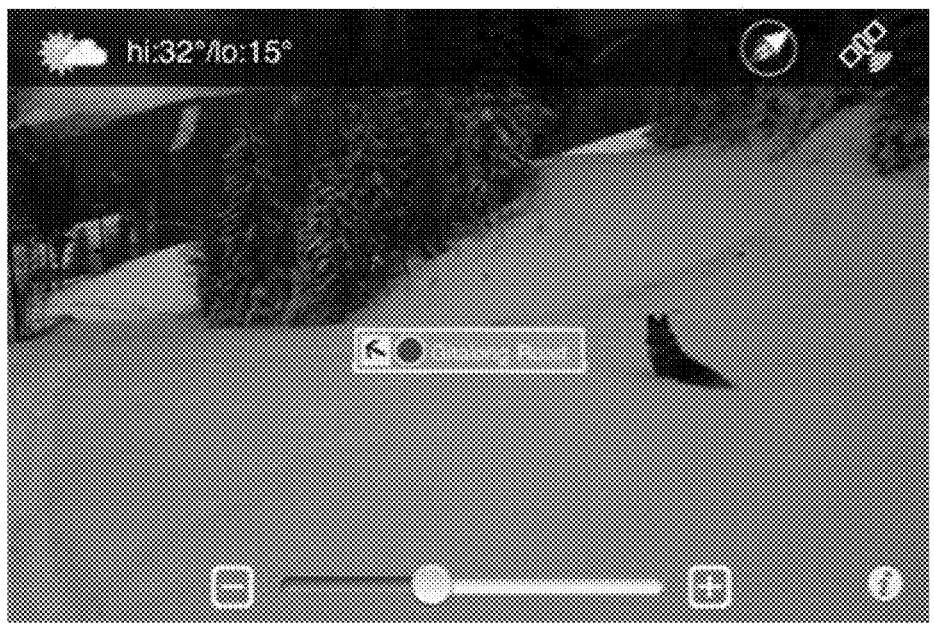
FIG. 17 illustrates a screen shot showing a ski lift run feature, according to embodiments of the present invention.

FIG. 17 illustrates a screen display showing a ski run called "Gitalong Road" which, in the display, traverses the user's view (from the top right of the screen across to the bottom left of the screen). Because the user is not on the ski run or near its start or end point, the ski run feature is displayed as described with respect to block 1108 of FIG. 11. In other words, the feature indicator box for "Gitalong Road" is displayed in the center of the display with a heading indicator showing that the ski run continues in the direction indicated by the arrow. If the user were to rotate the device 100 to the right of the view shown in FIG. 17, the heading arrow would rotate counter-clockwise as the feature display updated. Similarly, if the user were to rotate the device 100 to the left in of the view shown in FIG. 17, the heading arrow would rotate clockwise as the feature display updated, according to embodiments of the present invention.

Figure 18:
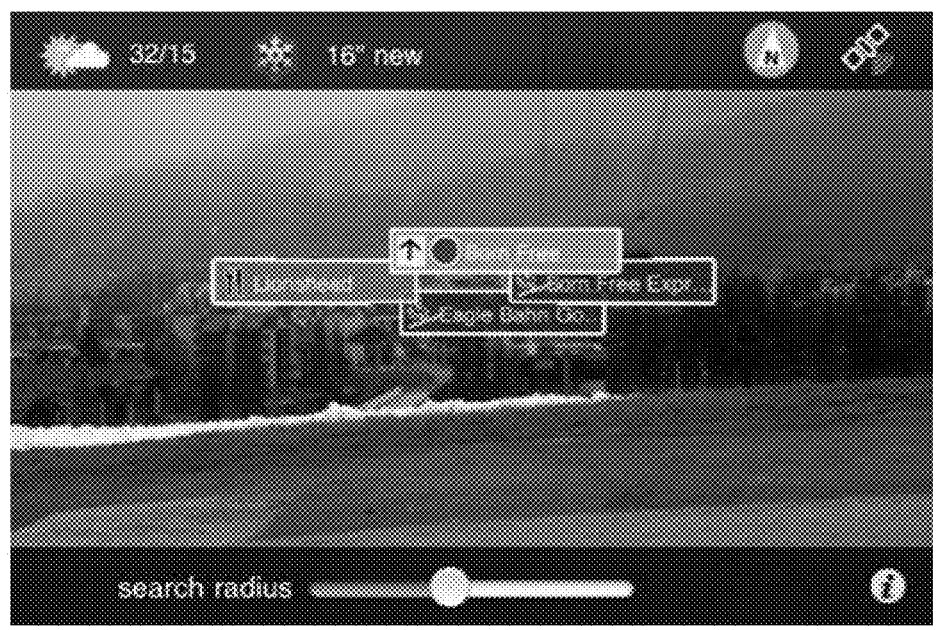
FIG. 18 illustrates a screen shot showing a lodge, ski run, and two ski lift features, according to embodiments of the present invention.
Figure 19:
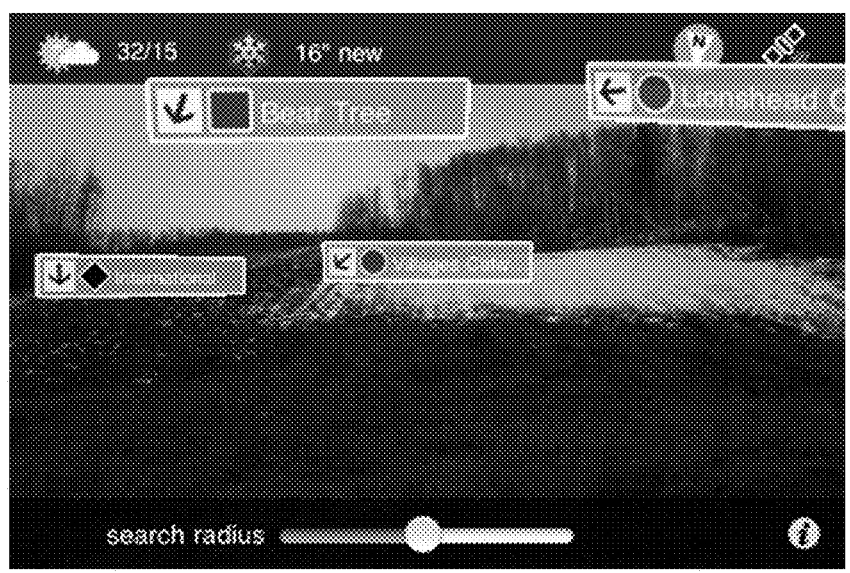
FIG. 19 illustrates a screen shot showing four ski run features, according to embodiments of the present invention.

FIG. 18 illustrates a screen display showing two ski lift features, a ski run feature, and a point feature, according to embodiments of the present invention. The point feature "Lionshead" is shown, for example in a different color, indicating the point location of a lodge or other building with a symbol indicating that food is served there, according to embodiments of the present invention. In addition, the start point of the ski run "Born Free" is shown, as well as the lift locations (start points) for two ski lifts. FIG. 19 illustrates a screen shot showing multiple ski run features within the field of view, according to embodiments of the present invention.

Figure 20:
FIG. 20 illustrates a screen shot showing a video clip feature, according to embodiments of the present invention.

FIG. 20 illustrates a screen shot showing a video clip feature, according to embodiments of the present invention. A video clip is overlayed onto an actual image in a fashion similar to that described above for a point feature, according to embodiments of the present invention. Including video clips in augmented reality overlay adds an additional level of information capability.

In the example of FIG. 20, a video about Elvis is played corresponding to a location of a particular Elvis landmark on the screen, when such landmark is within the field of view, according to embodiments of the present invention. As the user moves the mobile device, the video clip continues to play, although its position on the screen may change so that it continues to correspond to the location of the corresponding point feature within the field of view, according to embodiments of the present invention. Additional video clip features or other point or line features may be displayed when they are within a certain customizable distance range of the device and/or when they are not present in the current field of view, for example with a box with a still image, a textual description, and an arrow pointing in the direction in which the device should be rotated in order to bring the other feature within the field of view, according to embodiments of the present invention. As illustrated in FIG. 20, the Evel Knievel fountain is to the right about one mile away, while the Dunes implosion is to the right about two miles away, according to embodiments of the present invention.

Figure 21:
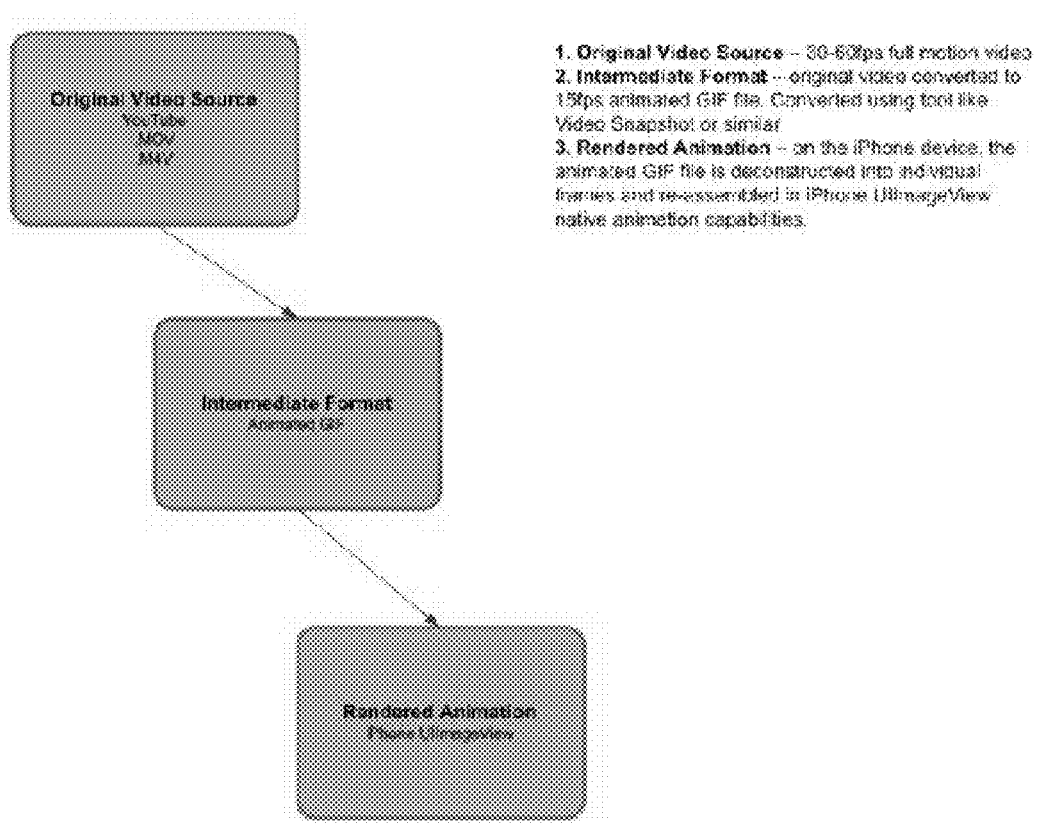
FIG. 21 illustrates an augmented reality video overlay process, according to embodiments of the present invention.

FIG. 21 illustrates an augmented reality video overlay process, according to embodiments of the present invention. Many mobile devices, for example the iPhone, are limited to playing media (videos) natively in a full screen (480×240) view. To support using a video as a POI marker in an Augmented Reality application, a process may be followed to play video in a smaller size (in one case 120×90) and centered on any given x,y coordinate on the screen. The following steps may be performed to facilitate such a process:

The original video source for the overlay is acquired, which may be a YouTube Video, QuickTime MOV Video, MPEG-4 Video, and/or the like. Such an original video source need not be associated with a specific file type, frame rate or quality requirement.

The original source video may then be converted to an Animated GIF to support further processing. This can be accomplished using licensed software packages such as Video Snapshot by Xilisoft, for example. To manage file size, frame rate may be reduced to around 15 fps, which eliminates frames from the source video but still produces desired results.

The following steps may be taken to convert the animated GIF:
  open the animated GIF file;
  retrieve individual frames into an image array by processing byte data of the animated GIF;
  assign Image array to image user control; and
  animate image array of image user control by setting animation duration to the length (in seconds) of the animated GIF.

According to embodiments of the present invention, an augmented reality overlay includes a combination of point features, line features, and/or video features, or an ability to display a combination of point features, line features, and/or video features.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method comprising:
  receiving image data from a device, wherein the image data represents visual data within a viewing range of the device;
  receiving geographic position data about the device from a positioning system, the geographic position data including at least latitude, longitude, and elevation of the device;
  receiving orientation data about the device from an orientation system, wherein the orientation data is three-dimensional orientation data;
  querying a spatial database, the spatial database comprising one or more feature data sets corresponding to spatial elements classifiable as one of a point feature, a line feature, and an area feature, each of the one or more feature data sets including at least a three-dimensional location identification and a feature identifier;
  generating a field of view bounding definition based upon a partial spherical volume extending radially from the device to a feature range distance and bounded by a combination of an upper, lower, and side extents of the viewing range of the device as at least partially derived from the orientation data;
  generating a field of view inclusion feature data set by identifying one or more of the one or more feature data sets, an instance of the point feature being included within the field of view inclusion feature data set when the three-dimensional location identification thereof is within the partial spherical volume corresponding to the field of view bounding definition, an instance of the line feature being included within the field of view inclusion feature data set when at least a point along the line has a three-dimensional location identification thereof is within the partial spherical volume corresponding to the field of view bounding definition, and an instance of the area feature being included within the field of view inclusion feature data set when at least a point within the area has a three-dimensional location identification thereof is within the partial spherical volume corresponding to the view of view bounding definition, the included one of the three-dimensional location identification being that which is most proximal to an origin view axis of the device; and
  merging the field of view inclusion feature data with the image data to create an augmented reality display.

2. The method of claim 1, further comprising:
  displaying the augmented reality display.

3. The method of claim 2, further comprising displaying the augmented reality display on a screen, wherein the field of view inclusion feature data comprises a virtual feature, and wherein a position of the virtual feature on the screen corresponds to an actual feature represented by the virtual feature.

4. The method of claim 2, wherein displaying the augmented reality display comprises overlaying the field of view inclusion feature data set onto the image data.

5. The method of claim 1, wherein at least two of the one or more feature data sets include a common feature identifier, and wherein the at least two of the one or more feature data sets are part of the line feature.

6. The method of claim 5, wherein the line feature includes a start point and an end point, wherein the start point is within the field of view inclusion feature data set, wherein the end point is not within the field of view inclusion feature data set, wherein the device is within a selected distance of the start point, and wherein the augmented reality display includes a representation of the start point but not the end point.

7. The method of claim 5, wherein the line feature includes a start point and an end point, wherein the start point is not within the field of view inclusion feature data set, wherein the end point is within the field of view inclusion feature data set, wherein the device is within a selected distance of the end point, and wherein the augmented reality display includes a representation of the end point but not the start point.

8. The method of claim 5, wherein the line feature includes a start point and an end point, wherein the device is outside of a selected distance from the start point and the end point and within the selected distance from the line feature, and wherein the augmented reality display includes a representation of a lowest end point or a highest start point of the line feature that is within the partial spherical volume corresponding to the field of view bounding definition.

9. The method of claim 8, wherein the start point is the highest start point.

10. The method of claim 5, wherein the line feature includes a start point and an end point, wherein the device is outside of a selected distance from the start point and the end point and the line feature, and wherein the augmented reality display includes a representation of a direction of the line feature.

11. The method of claim 2, further comprising displaying additional information about a feature data set in response to a user request.

12. The method of claim 11, wherein the additional information comprises a distance from the device to a location of the feature data set.

13. The method of claim 2, wherein displaying the augmented reality display comprises:
identifying one or more of the one or more feature data sets in which the at least one three-dimensional location identification is within a selected distance from the device; and
displaying the one or more of the one or more feature data sets at the elevation of the device.

14. The method of claim 1, wherein the augmented reality display includes at least one video feature.

15. A non-transitory computer readable medium including instructions that, when executed by a processor, cause the processor to:
receive image data from a device, wherein the image data represents visual data within a viewing range of the device;
receive geographic position data about the device from a positioning system, the geographic position data including at least latitude, longitude, and elevation of the device;
receive orientation data about the device from an orientation system, wherein the orientation data is three-dimensional orientation data;
query a spatial database, the spatial database comprising one or more feature data sets corresponding to spatial elements classifiable as one of a point feature, a line feature, and an area feature, each of the one or more feature data sets including at least a three-dimensional location identification and a feature identifier;
generate a field of view bounding definition based upon a partial spherical volume extending radially from the device to a feature range distance and bounded by a combination of an upper, lower, and side extents of the viewing range of the device as at least partially derived from the orientation data;
generate a field of view inclusion feature data set by identifying one or more of the one or more feature data sets, an instance of the point feature being included within the field of view inclusion feature data set when the three-dimensional location identification thereof is within the partial spherical volume corresponding to the field of view bounding definition, an instance of the line feature being included within the field of view inclusion feature data set when at least a point along the line has a three-dimensional location identification thereof is within the partial spherical volume corresponding to the field of view bounding definition, and an instance of the area feature being included within the field of view inclusion feature data set when at least a point within the area has a three-dimensional location identification thereof is within the partial spherical volume corresponding to the view of view bounding definition, the included one of the three-dimensional location identification being that which is most proximal to an origin view axis of the device; and
merge the field of view inclusion feature data with the image data to create an augmented reality display.

16. A system comprising:
a camera configured to generate image data, the camera having a viewing range;
a positioning system configured to generate geographic position data, the geographic position data including at least latitude, longitude, and elevation of the camera;
an orientation system configured to generate three-dimensional orientation data;
a display device; and
a computing device configured to:
receive the image data, the geographic position data, and the three-dimensional orientation data;
query a spatial database, the spatial database comprising one or more feature data sets corresponding to spatial elements classifiable as one of a point feature, a line feature, and an area feature, each of the one or more feature data sets including at least a three-dimensional location identification and a feature identifier;
generate a field of view bounding definition based upon a partial spherical volume extending radially from the device to a feature range distance and bounded by a combination of an upper, lower, and side extents of the viewing range of the device as at least partially derived from the orientation data;
generate a field of view inclusion feature data set by identifying one or more of the one or more feature data sets, an instance of the point feature being included within the field of view inclusion feature data set when the three-dimensional location identification thereof is within the partial spherical volume corresponding to the field of view bounding definition, an instance of the line feature being included within the field of view inclusion feature data set when at least a point along the line has a three-dimensional location identification thereof is within the partial spherical volume corresponding to the field of view bounding definition, and an instance of the area feature being included within the field of view inclusion feature data set when at least a point within the area has a three-dimensional location identification thereof is within the partial spherical volume corresponding to the view of view bounding definition, the included one of the three-dimensional location identification being that which is most proximal to an origin view axis of the device;
merge the field of view inclusion feature data with the image data to create an augmented reality display; and
display the augmented reality display on the display device.

17. The system of claim 16, wherein the positioning system is a global positioning system.

18. The system of claim 16, wherein the orientation system comprises a compass.

19. The system of claim 16, wherein the orientation system comprises an accelerometer.

20. The system of claim 16, wherein the orientation system comprises a tilt angle sensor.

21. The system of claim 18, wherein the orientation system further comprises an accelerometer and a tilt sensor.

* * * * *